United States Patent [19]
Mattern

[11] Patent Number: 5,519,224
[45] Date of Patent: May 21, 1996

[54] METHOD OF LOCALIZING SCINTILLATION EVENTS DETECTED BY SCINTILLATION CAMERA SYSTEMS

[75] Inventor: Detlef Mattern, Schaumburg, Ill.

[73] Assignee: Siemens Medical Systems, Inc., Iselin, N.J.

[21] Appl. No.: 347,525

[22] Filed: Nov. 30, 1994

[51] Int. Cl.$^6$ .................................................. G01T 1/20
[52] U.S. Cl. ...................... 250/369; 250/363.07; 250/366
[58] Field of Search ................................... 250/369, 366, 250/363.07

[56] References Cited

U.S. PATENT DOCUMENTS 5,118,948  6/1992  Ito et al. ................................. 250/369
5,293,044  3/1994  Klingenbeck-Regn et al. ........ 250/369

Primary Examiner—Constantine Hannaher
Assistant Examiner—Virgil O. Tyler
Attorney, Agent, or Firm—Mark H. Jay

[57] ABSTRACT

When a PMT "views" a scintillation event in the scintillation crystal of a scintillation camera system, the PMT produces an output signal. Based on the output signal, the event can be localized to a circular locus of points ("PMT locus"). Further localization can be accomplished on the basis of straight lines which are unambiguously determined by intersections between such PMT loci.

4 Claims, 5 Drawing Sheets

FIG. 7

```
┌─────────────────────────────────────────┐
│     IDENTIFY THREE PMTS PRODUCING       │
│       THE HIGHEST OUTPUT SIGNALS        │
│    IN RESPONSE TO A SINGLE SCINTILLATION│
│ AND UTILIZE ONLY THOSE THREE OUTPUT SIGNALS│
│         TO LOCALIZE THE EVENT           │
└─────────────────────────────────────────┘
                    │
                    ▼
┌─────────────────────────────────────────┐
│  COMPUTE THREE LINES WHICH CONNECT EACH TWO│
│   INTERSECTION POINTS WHICH LIE ON THE SAME│
│           PAIR OF PMT LOCI              │
└─────────────────────────────────────────┘
                    │
                    ▼
┌─────────────────────────────────────────┐
│      DETERMINING THE CROSSPOINT(S)      │
│        OF THE THREE COMPUTED LINES      │
└─────────────────────────────────────────┘
                    │
                    ▼
              ╱ IS ╲
             ╱ THERE MORE ╲     NO
            ╱  THAN ONE    ╲─────────┐
             ╲ CROSSPOINT? ╱         │
              ╲           ╱          │
                 │ YES               │
                 ▼                   ▼
┌─────────────────────────────┐  ┌──────────┐
│   LOCALIZE EVENT BY CENTROID│  │ LOCALIZE │
│ CALCULATION BASED ON THREE CROSSPOINTS│ │ EVENT AT │
└─────────────────────────────┘  │CROSSPOINT│
                 │               └──────────┘
                 ▼      ◄────────────┘
              ( END )
```

METHOD OF LOCALIZING SCINTILLATION EVENTS DETECTED BY SCINTILLATION CAMERA SYSTEMS

BACKGROUND OF THE INVENTION

The invention relates to nuclear medicine, and more particularly relates to scintillation camera systems for use in nuclear medicine studies. In its most immediate sense, the invention relates to localization of scintillation events which are detected by a scintillation camera system.

In a conventional Anger-type scintillation an array of photodetectors—conventionally, photomultiplier tubes ("PMTs")—is located adjacent a scintillation crystal of e.g. NaI(Tl). While various schemes are used to correct for various nonlinearities in the response of the system, scintillation events are primarily localized by applying a centroid-type calculation to the outputs of the PMTs (which outputs are weighted using a resistor matrix and then added together).

Such localization methodology is most practical when used with analog-type detectors. When digital detector techology is utilized, such techniques are more difficult to implement. It would be advantageous to provide an alternate methodology for localizing scintillation events in scintillation camera detectors of the digital type.

Additionally, centroid calculations and the various linearity correction methods used with them are computationally intensive and require substantial computer resources. It would be advantageous to provide a methodology which did not require intensive calculation and high-performance computer equipment.

The invention proceeds from the known relationship that as distance between a scintillation event and the center of the field of view of the PMT increases, the amplitude of the output signal from the PMT decreases. Thus, there is a known relationship between the amplitude of the output signal and the radial distance between the event and the center of the PMT field of view.

Therefore, when the amplitude of the output signal is known, it follows that the event will be located somewhere on a circular locus of points (hereinafter, "PMT locus"). The center of this PMT locus will coincide with the center of the field of view of the PMT and the radius of this PMT locus will be a function of the amplitude of the output signal. Such a PMT locus can be "looked up" in a lookup table which is programmed into a fast memory (e.g. a ROM), since the location of the center of the field of view of the PMT is known in advance and remains fixed for each PMT and the only variable is the radius of the PMT locus.

Furthermore, when a single event is detected by two adjacent PMTs, the event can be located more precisely. In this case, the event will lie on two PMT loci, each concentric with the center of the field of view of one of the PMTs and having a radius which is a function of the amplitude of the output signal from that PMT. Since the spacing of the PMTs is such that these two PMT loci will intersect at two points, it follows that knowledge of the output signals from two PMTs permits the event location to be localized to either one of these two intersection points.

Let it now be assumed that a single event is detected by three adjacent PMTs. In the general case, the three PMT loci will intersect at six points that can be classified into three pairs of points, each pair of points lying on a common pair of PMT loci. If a line is constructed to connect each such pair of intersection points, the three thus-constructed lines will bound a small area in which the event will be located.

Because the above-described PMT loci are determinable by a method which utilizes a lookup table, and because the geometrical relationship between adjacent PMTs is known in advance and does not change, the location of the event can be determined without using a large number of floating-point operations and is easily implemented in a digital system without requiring substantial computational resources.

In accordance with the invention, the output signals from a plurality of photodetectors (advantageously PMTs) are used to determine the points at which certain two-dimensional curves would intersect. The curves are unambiguously determined by intersections between the photodetector loci. In accordance with the preferred embodiment each such curve is a straight line that is so calculated as to connect a pair of points which lie on the same pair of PMT loci. The thus-determined intersection points bound a relatively small two-dimensional region, in which the event is located.

Advantageously, and in accordance with the preferred embodiment of the invention, this determination is carried out using a mathematical algorithm wherein many terms have been precomputed and have been stored in a fast memory (e.g. ROM) lookup table.

In this way, the invention can easily be implemented in a digital detector, the use of computation is held to a minimum and high-powered computer resources are unnecessary.

BRIEF DESCRIPTION OF THE DRAWINGS

The invention will be better understood with reference to the following illustrative and non-limiting drawings, in which:

FIG. 7 is a flow chart illustrating a method in accordance with the invention.

DETAILED DESCRIPTION OF PREFERRED EMBODIMENTS

Figure 1:
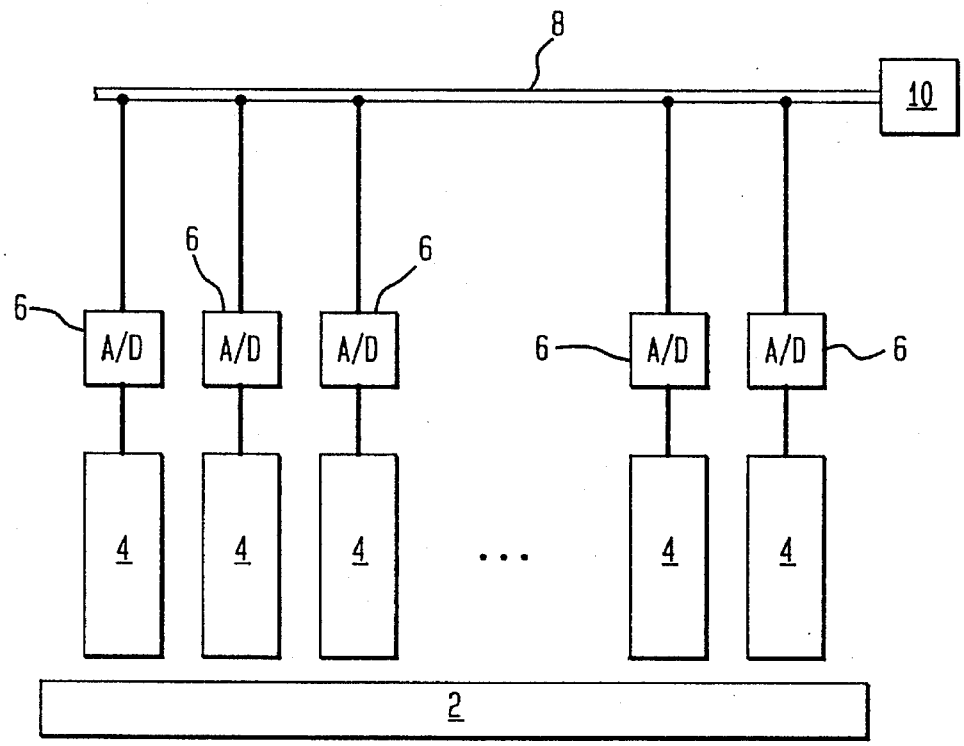
FIG. 1 schematically illustrates a digital scintillation camera detector of the type with which the invention is designed for use.

In a digital detector of the type with which the invention is designed for use such as is schematically illustrated in FIG. 1, a scintillation crystal 2 of e.g. NaI(Tl) is placed in optically communicative relationship with a plurality of PMTs 4. Each of the PMTs 4 is associated with an A/D converter 6, and digitized information identifying each PMT output signal and the particular PMT 4 which generated that signal travels along a bus 8 to a computer 10.

When such apparatus is in use, a radioisotope (not shown) is administered to a patient (not shown), and gamma radiation leaving the patient is collimated by a collimator (not shown) and made incident upon the crystal 2. This causes scintillation events (not shown) to be created within the crystal 2. When such events occur in the crystal 2, the PMTs 4 which "view" each event generate output signals which are digitized and which are eventually input to the computer 10. The computer 10 utilizes this information to create images (not shown) of the patient.

It is known (see FIG. 2) that the amplitude of a PMT output signal varies with the distance between the corresponding scintillation event and the center of the field of view of the PMT. In accordance with the invention, this variation is measured and stored (by itself, or together with other information as described below) as a lookup table in a fast memory (e.g. a ROM).

Figure 3:
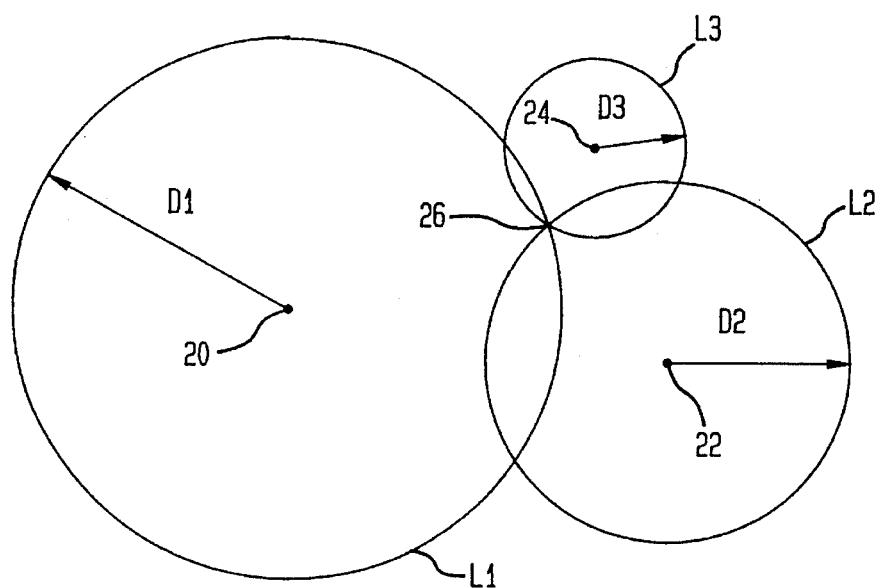
FIG. 3 schematically illustrates the principle of operation of the invention.

FIG. 3 shows how such a relationship may be utilized to localize the location of a scintillation event using the output signals from a plurality of PMTs 4. When a plurality of PMTs 4 (the example of FIG. 3 shows three PMTs 4, but this is only preferred and more PMTs can be used) "view" a scintillation event, the output signals from those PMTs 4 can be used to localize the event using a geometrical methodology. Let it be assumed that location 20 is the center of the field of view of a first PMT 4, location 22 is the center of the field of view of a second PMT 4, and location 24 is the center of the field of view of a third PMT 4. The first PMT 4 will produce an output signal which could be input to the above-described ROM. From that ROM would then be output a distance D1, so that the event would be known to lie somewhere along L1, the circular PMT locus which is centered on location 20 and which has a radius D1. So, too, the second PMT 4 could produce an output signal which could be input to the ROM and which could produce an output of distance D2. The event would then be known to lie somewhere along L2, the circular PMT locus which is centered on location 22 and which has a radius D2. Finally, the third PMT 4 will produce an output signal, which if input to the ROM would produce an output of distance D3. This would produce a third PMT locus L3, which would be centered on location 24 and which would have a radius D3.

In this example, the three PMT loci L1, L2 and L3 all intersect at location 26, which is the location of the scintillation event. Location 26 could be identified by counting, for each of the intersection points between the three PMT loci L1, L2 and L3, the number of loci which intersect at that point. (Such a methodology can conveniently be implemented in a digital system without using excessive computational resources.) The intersection point which lies on the highest number of PMT loci is the location of the scintillation event.

Figure 4:
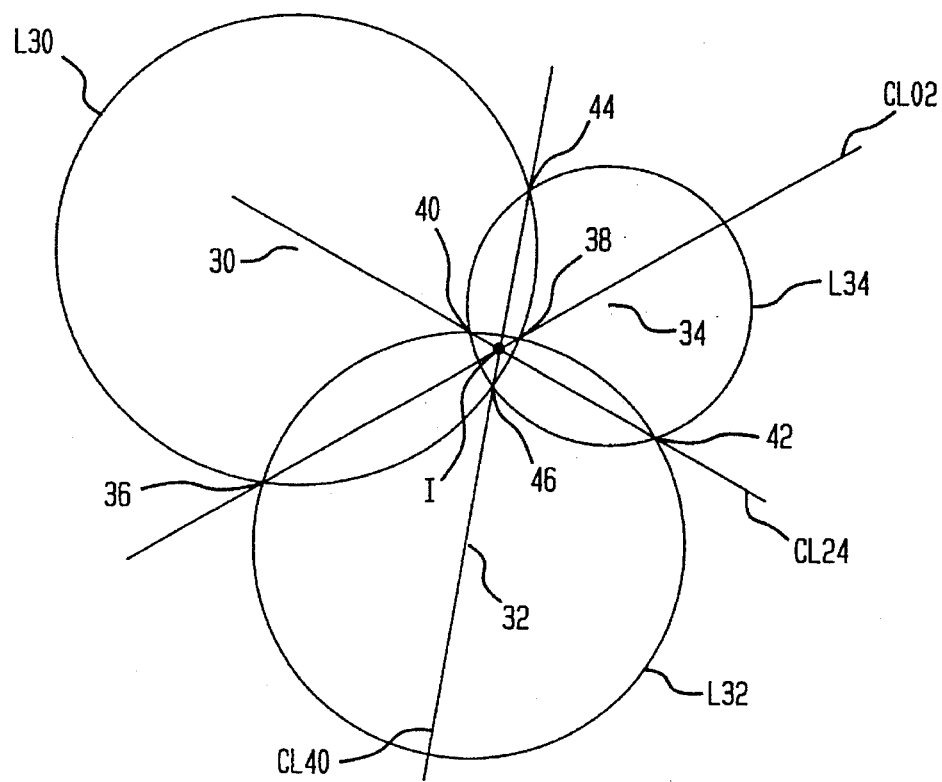
FIG. 4 schematically illustrates a preferred embodiment of the invention.

In general, the three PMT loci L1, L2 and L3 will never intersect at a single point. This is because the signals which produce L1, L2 and L3 suffer from statistical fluctuations. Accordingly, and with reference to the preferred embodiment of the invention which is illustrated in FIG. 4, the system calculates a straight line to connect each pair of intersection points which lie on the same two PMT loci and the region bounded by the thus-constructed lines may be evaluated to find the location of the event.

Thus, let it be assumed that an event is detected and that the three PMTs 4 having the highest output signals are PMTs which have field of view centers at points 30, 32 and 34; for brevity, these will be referred to as PMTs 30, 32 and 34. These three PMTs 30, 32 and 34 produce three distinct output signals which correspond to three PMT loci L30, L32 and L34. PMT loci L30 and L32 intersect at two intersection points 36 and 38, PMT loci L32 and L34 intersect at intersection points 40 and 42, and PMT loci L34 and L30 intersect at intersection points 44 and 46.

The system then calculates three lines which lie along these intersection points. Calculated line CL02 connects intersection points 36 and 38, calculated line CL24 connects intersection points 40 and 42, and calculated line CL40 connects intersection points 44 and 46.

Figure 5:
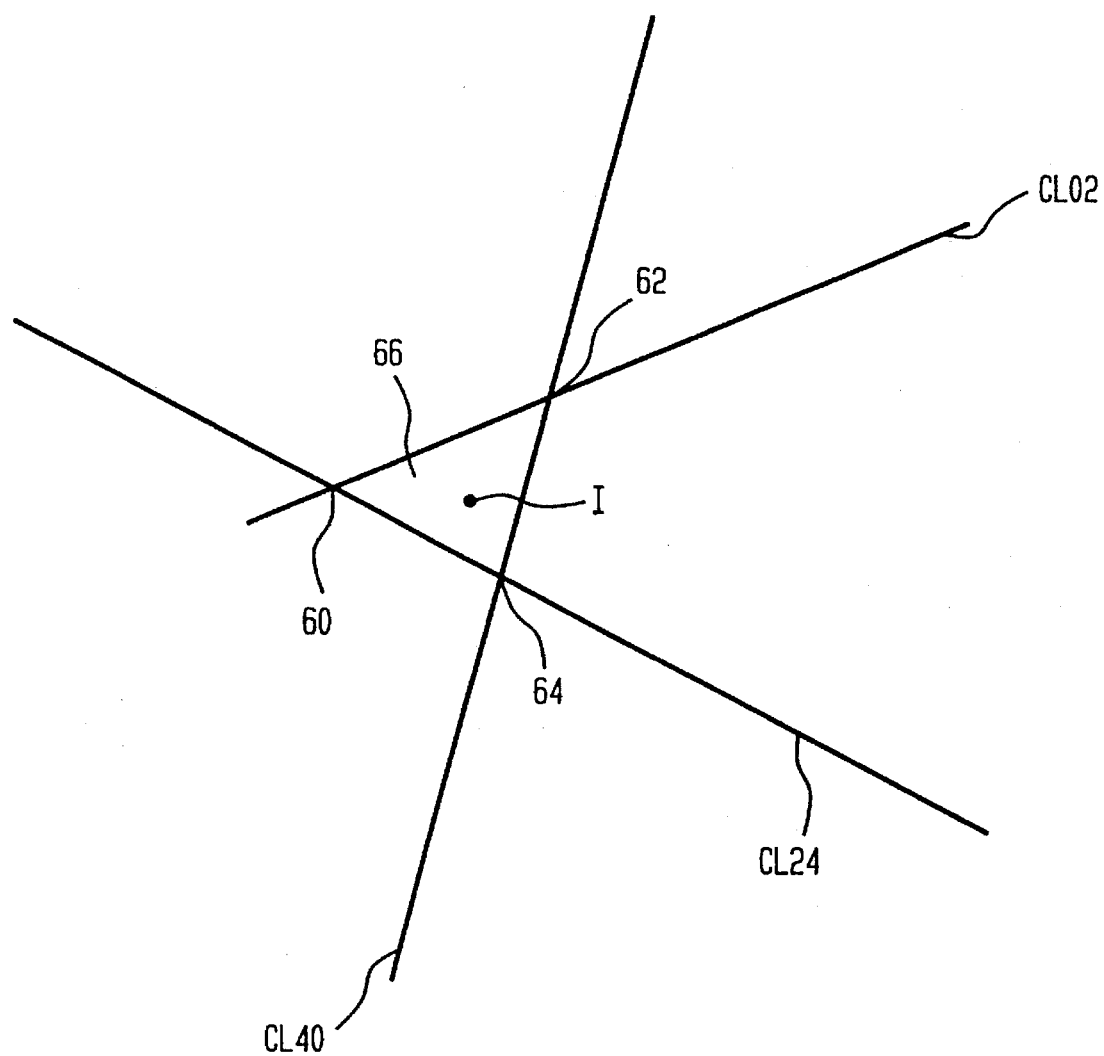
FIG. 5 schematically illustrates a portion of FIG. 4.

In this example, the calculated lines CL02, CL24 and CL40 all appear to intersect at a single point I (the location of the event). This is only because of the scale of FIG. 4; in reality the calculated lines CL02, CL24 and CL40 will always intersect at three crosspoints 60, 62 and 64 and will bound a small two dimensional area 66 (FIG. 5). In this instance, the event location I can be localized either by setting I equal to some arbitrary location within the area 66 or by using a centroid calculation based on the locations of the crosspoints 60, 62 and 64.

A preferred algorithm for rapidly determining the intersection point of the calculated lines will now be discussed in connection with FIG. 6. The algorithm is very general and assumes that two pairs (i.e. four, in total) of PMTs contribute to the localization of the event. By assuming that one tube from each pair is the same PMT, this four PMT algorithm reduces to a three PMT algorithm.

Let it be assumed that there are two pairs of PMTs; (i,j) and (k,l). The locations of the PMTs can be described by four vectors:

$$\vec{r}_i, \vec{r}_j, \vec{r}_k, \vec{r}_l$$

Each of the above-described calculated lines is at right angles to a line which connects the centers of the fields of view of two PMTs. In this instance, vectors $$\vec{b}_{ij}, \vec{b}_{kl}$$

start respectively from the the ith and kth PMT and point to the jth and lth PMT. Unit vectors $$\vec{e}_{ij}, \vec{e}_{kl}$$

are aligned with the calculated lines and are, by construction, normal to the vectors $$\vec{b}_{ij}, \vec{b}_{kl}$$

Figure 6:
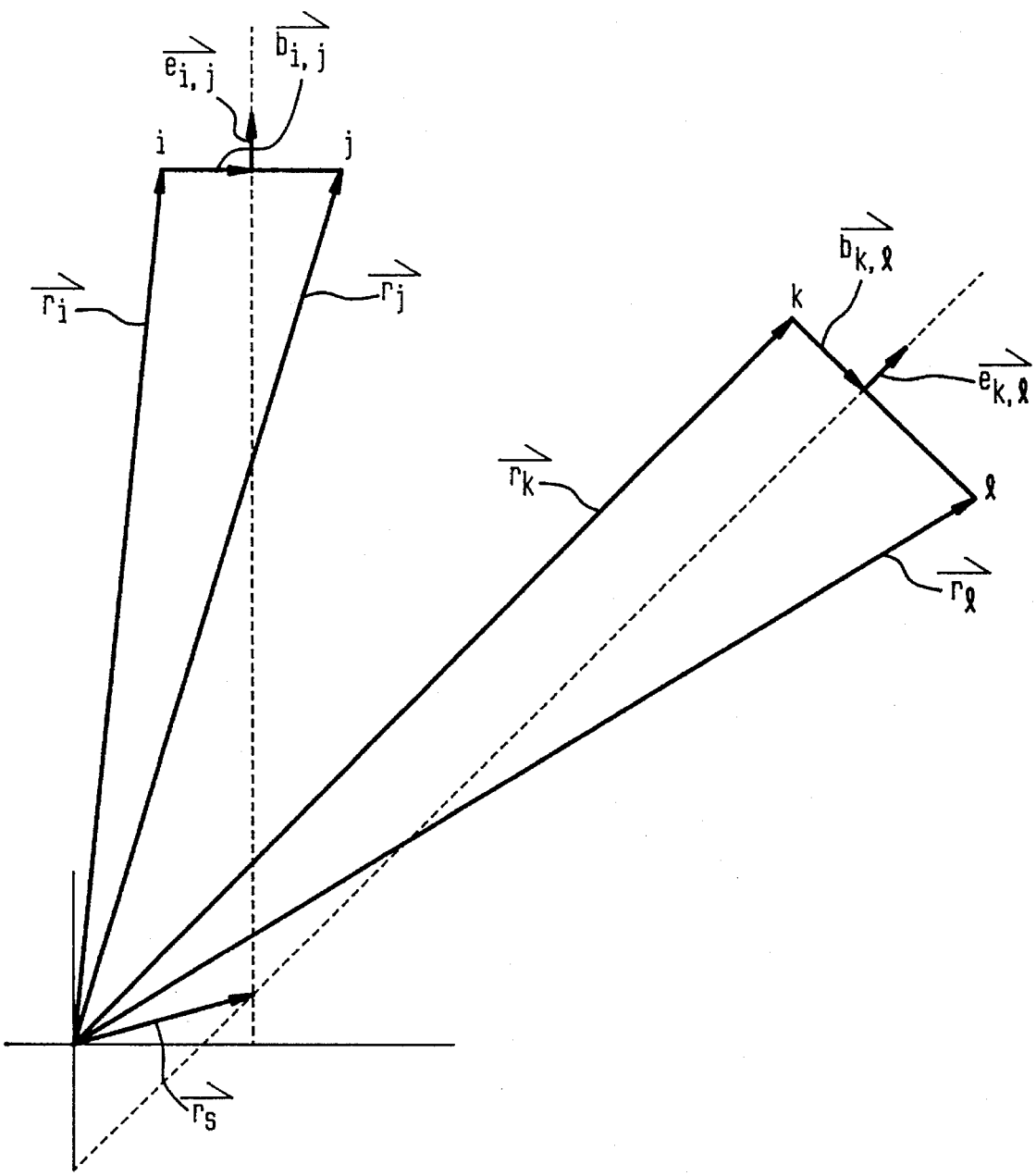
FIG. 6 illustrates an algorithm which can be utilized in accordance with the preferred embodiment of the invention.

Referring to FIGS. 3 and 6, it can be shown that $$b_{ij}=(D_i^2+d_{ij}^2-D_j^2)/2d_{ij}=P_{ij}-P_{ji}+q_{ij}$$

with $$P_{ij}=D_i^2/2d_{ij}$$

and $$q_{ij}=d_{ij}/2$$

it being understood that $$D_i, D_j$$

are the radii of the aforementioned circles around PMTs i and j and $$d_{ij}$$

is the length of the vector $\vec{d}_{ij}$, starting at location i and ending at location j in FIG. 6.

The calculated lines have the following equations $$\vec{r} = \vec{r}_i + \vec{b}_{ij} + \epsilon \vec{e}_{ij}$$

$$\vec{r} = \vec{r}_k + \vec{b}_{k1} + \delta \vec{c}_{k1}$$

And the intersection of these two calculated lines, which is the location of the event, exists where the right hand side of each equation is the same. Thus $$\epsilon_s = \alpha b_{ij} + \beta b_{k1} + \gamma$$

and $$\vec{r}_s = \vec{r}_i + \vec{b}_{ij} + \epsilon_s \vec{e}_{ij}$$

with $$\alpha = -\beta(\hat{\vec{b}}_{ij} \hat{\vec{b}}_{kl}); \quad \beta = -1/(\hat{\vec{e}}_{ij} \hat{\vec{b}}_{kl}); \quad \gamma = -\beta \hat{\vec{d}}_{ki} \hat{\vec{b}}_{kl}$$

The vectors $\hat{\vec{b}}_{ij}$ and $\hat{\vec{b}}_{kl}$ have unity length and the scalar numbers $\alpha$, $\beta$ and $\gamma$ can be stored in lookup tables because the vectors which generate them are determined by the geometry of the PMT array.

As the above example makes clear, it is not necessary to actually output the PMT loci themselves, or to determine where these PMT loci intersect. This is because the PMT array has a geometry which is known in advance and because the characteristics of the PMTs themselves are uniform and likewise known in advance.

Figure 2:
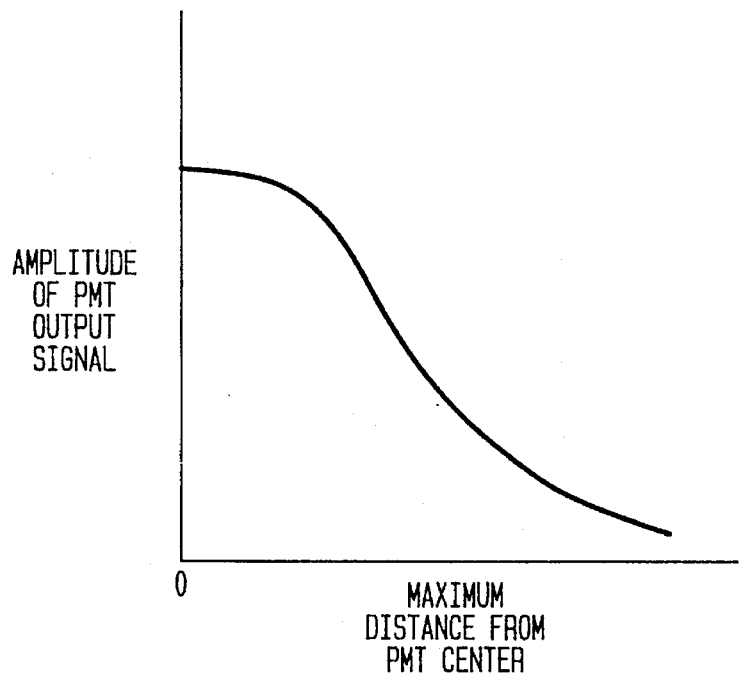
FIG. 2 schematically shows the relationship between PMT output amplitude and distance between a scintillation event and the center of the PMT field of view.

Thus, a preferred embodiment of the invention (see FIG. 7) assumes that the particular FIG. 2 response curves have been measured and and that all necessary information has been stored in a fast memory (e.g. a ROM) in lookup table format. When an event is detected by a plurality of PMTs (advantageously, three or more) the PMTs having the largest output signals are identified; in this instance, the three PMTs having the highest output signals are identified and only the output signals from those PMTs are considered. The outputs of those PMTs are used to determine lines connecting each two intersection points which lie on the same pair of PMT loci and determining the crosspoint(s) of such computed lines.

It will be understood that different methodology can be used without departing from the scope of the invention. For example, the calculated lines need not be straight; they may be best-fit curves of predefined types.

It will also be understood that in the above examples, the loci were circular as a result of the construction of conventional PMTs. The invention may be implemented using photodetectors other than PMTs and noncircular loci, if such noncircular loci appropriately describe the response of such other photodetectors.

Additionally, while in the preferred embodiment all the PMTs are identical, this need not be so. Where different PMTs, or indeed different photodetectors, are utilized it is only necessary to measure the FIG. 2 relationship for every type of photodetector used and to store that relationship in an appropriate number of lookup tables (one for each photodetector or photodetector type). Furthermore, although in the preferred embodiment event localization is carried out on the basis of the three highest output signals which are produced as the result of a single event, this is not necessarily so. The (lower) output signals from more remote PMTs may be considered if they are considered to have an acceptably high information content. The number of PMTs and the identity of the PMTs which contribute to the process of event localization is not part of the invention.

Although a preferred embodiment has been described above, the scope of the invention is limited only by the following claims:

I claim:

1. A method for localizing a particular scintillation event on the basis of outputs from a plurality of photodetectors in an Anger-type scintillation camera system, wherein each output from each photodetector is associated with a photodetector locus that relates to a corresponding one of the photodetectors, comprising:

obtaining the output from each photodetector in said plurality;

determining, based upon said output, intersection points between two-dimensional curves which are unambiguously determinable by intersections between the photodetector loci associated with all of said plurality.

2. The method of claim 1, wherein said two-dimensional curves are straight lines that connect pairs of intersections between the same pair of photodetector loci.

3. A method of localizing a scintillation event which is encompassed within the field of view of more than one PMT in a scintillation camera and which causes each of said more than one PMT to produce an output signal which is associated with a circular PMT locus that relates to a corresponding one of the PMTs, comprising the following steps:

upon detection of an event, identifying a predetermined number of PMTs having the highest output signals which relate to said detected event;

determining, based upon the output from each photodetector in said predetermined number of PMTs, intersection points between two-dimensional curves which are unambiguously determinable by intersections between the photodetector loci associated with all of said plurality.

4. The method of claim 3, wherein said two-dimensional curves are straight lines that connect pairs of intersections between the same pair of photodetector loci.

* * * * *